(12) United States Patent
Vacar et al.

(10) Patent No.: US 7,577,542 B2
(45) Date of Patent: Aug. 18, 2009

(54) METHOD AND APPARATUS FOR DYNAMICALLY ADJUSTING THE RESOLUTION OF TELEMETRY SIGNALS

(75) Inventors: Dan Vacar, San Diego, CA (US); David K. McElfresh, San Diego, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 184 days.

(21) Appl. No.: 11/786,684

(22) Filed: Apr. 11, 2007

(65) Prior Publication Data

US 2008/0252481 A1 Oct. 16, 2008

(51) Int. Cl.
*G06F 11/30* (2006.01)
*G06F 11/22* (2006.01)

(52) U.S. Cl. .................. 702/124; 702/185; 702/186; 714/25; 714/47

(58) Field of Classification Search .......... 702/124, 702/58, 59, 185, 186
See application file for complete search history.

(56) References Cited

U.S. PATENT DOCUMENTS 7,020,802 B2 * 3/2006 Gross et al. ............. 714/39
7,248,980 B1 * 7/2007 Gross et al. ............. 702/66
2006/0282705 A1 * 12/2006 Lopez et al. ............. 714/27
2007/0294591 A1 * 12/2007 Usynin et al. ............ 714/45

OTHER PUBLICATIONS

Gross et al., "Proactive Detection of Software Aging Mechanisms in Performance Critical Computers", 2003, IEEE, 7 pages.*

\* cited by examiner

*Primary Examiner*—Hal D Wachsman
(74) *Attorney, Agent, or Firm*—Park, Vaughan & Fleming LLP

(57) ABSTRACT

One embodiment of the present invention provides a system that dynamically adjusts data resolution during proactive-fault-monitoring in a computer system. During operation, the system temporarily stores high-resolution data for a telemetry signal from the computer system in a buffer. The system then generates low-resolution data for the telemetry signal from the high-resolution data. Next, the system monitors the low-resolution data, and while doing so, determines if an anomaly exists in the low-resolution data. If an anomaly exists in the low-resolution data, the system records the high-resolution data from the buffer on a storage device.

21 Claims, 3 Drawing Sheets

METHOD AND APPARATUS FOR DYNAMICALLY ADJUSTING THE RESOLUTION OF TELEMETRY SIGNALS

BACKGROUND

1. Field of the Invention

The present invention generally relates to techniques for proactive fault-monitoring in computer systems. More specifically, the present invention relates to a method and an apparatus that dynamically adjusts the resolution of telemetry signals which are collected during proactive-fault-monitoring in a computer system.

2. Related Art

Modern servers are typically equipped with a significant number of sensors which monitor various signals. These monitored signals can include: physical variables, such as temperatures, voltages, and currents; and software performance metrics, such as CPU usage, I/O traffic, and memory utilization. Outputs from this monitoring process can be used to generate time series data for these signals, which are referred to as "telemetry signals." Note that the physical variable telemetry signals are typically sampled from a continuous analog signal and are digitized using analog-to-digital (A/D) converters.

These telemetry signals can subsequently be analyzed using "electronic prognostics" techniques. Applications of electronic prognostics techniques include: "proactive-fault-monitoring," which identifies leading indicators of component or system failures before the failures actually occur; and "reliability stress studies," which monitor components as they are subjected to stressful conditions that accelerate failure mechanisms in the components.

Ideally, high-resolution telemetry signals can be collected for critical system variables to facilitate high-precision detection and evaluation of anomalous activity. Such high-resolution telemetry signals also enable a system to quickly determine whether a "remedial action" is necessary, and to select the proper remedial action. However, such high-resolution telemetry signals are rarely collected during an electronic prognostics process because of resource limitations, such as: limited data acquisition bandwidth, limited storage space for recording the collected data, limited instrumentation for gathering signals, and limitations on the processing power required to process the telemetry signals. Furthermore, it is generally inefficient to process high-resolution telemetry signals because telemetry signals are generally collected during operation of the system when no degradation is present and thus high-resolution signals are not needed to detect subtle anomalies. Consequently, conventional techniques typically collect low-resolution telemetry signals, which have low sampling rate and a high quantization error.

Unfortunately, using low-resolution telemetry signals for electronic prognostics purposes can significantly reduce the probability of detecting and predicting onset of subtle anomalies that precede component or system failures. This can lead to a significant delay in taking remedial action after a problem has occurred.

Hence, what is needed is a method and an apparatus that facilitates collecting high-resolution telemetry signals without the above-described problems.

SUMMARY

One embodiment of the present invention provides a system that dynamically adjusts data resolution during proactive-fault-monitoring in a computer system. During operation, the system temporarily stores high-resolution data for a telemetry signal from the computer system in a buffer. The system then generates low-resolution data for the telemetry signal from the high-resolution data. Next, the system monitors the low-resolution data, and while doing so, determines if an anomaly exists in the low-resolution data. If an anomaly exists in the low-resolution data, the system records the high-resolution data from the buffer on a storage device.

In a variation on this embodiment, the system generates the low-resolution data from the high-resolution data by: computing a sequence of ensemble averages from the high-resolution data, wherein each ensemble average is the average of the high-resolution data within a corresponding predetermined interval; and forming the low-resolution data from the sequence of ensemble averages.

In a variation on this embodiment, the system determines if an anomaly exists in the low-resolution data by: applying a sequential probability ratio test (SPRT) to the low-resolution data and a time derivative of the low-resolution data. The system determines that an anomaly exists if the SPRT generates an alarm.

In a variation on this embodiment, while an anomaly continues to exist, the system: stores the high-resolution data in the buffer while recording the high-resolution data on the storage device; generates the low-resolution data from the high-resolution data; and monitors the low-resolution data.

In a variation on this embodiment, if the telemetry signal returns to normal, the system records time information associated with the anomaly and stops recording of the high-resolution data on the storage device.

In a variation on this embodiment, the system performs a root-cause-analysis operation on the high-resolution data recorded on the storage device.

Another embodiment of the present invention provides another system that dynamically adjusts data resolution during proactive-fault-monitoring in a computer system. During operation, this system samples a telemetry signal from the computer system at a predetermined sampling rate. The system then analyzes the sampled telemetry signal to detect and/or predict anomalous activity in the telemetry signal. If anomalous activity is detected and/or predicted, the system samples and analyzes the telemetry signal at an increased sampling rate.

In a variation on this embodiment, the system dynamically adjusts the sampling rate based on the detected and/or predicted anomalous activity of the telemetry signal.

In a variation on this embodiment, if the behavior of the telemetry signal returns to normal, the system restores the sampling rate to the predetermined sampling rate.

Another embodiment of the present invention provides yet another system that dynamically adjusts data resolution during proactive-fault-monitoring in a computer system. During operation, the system samples a telemetry signal using a predetermined number of bits per sample. The system then analyzes the sampled telemetry signal to detect and/or predict anomalous activity in the telemetry signal. If anomalous activity is detected and/or predicted, the system samples and analyzes the telemetry signal using an increased number of bits per sample.

In a variation on this embodiment, the system dynamically adjusts the number of bits per sample based on the detected and/or predicted anomalous activity of the telemetry signal.

In a variation on this embodiment, if the behavior of the telemetry signal returns to normal, the system resumes sampling of the telemetry signal using the predetermined number of bits per sample.

DETAILED DESCRIPTION

Figure 1:
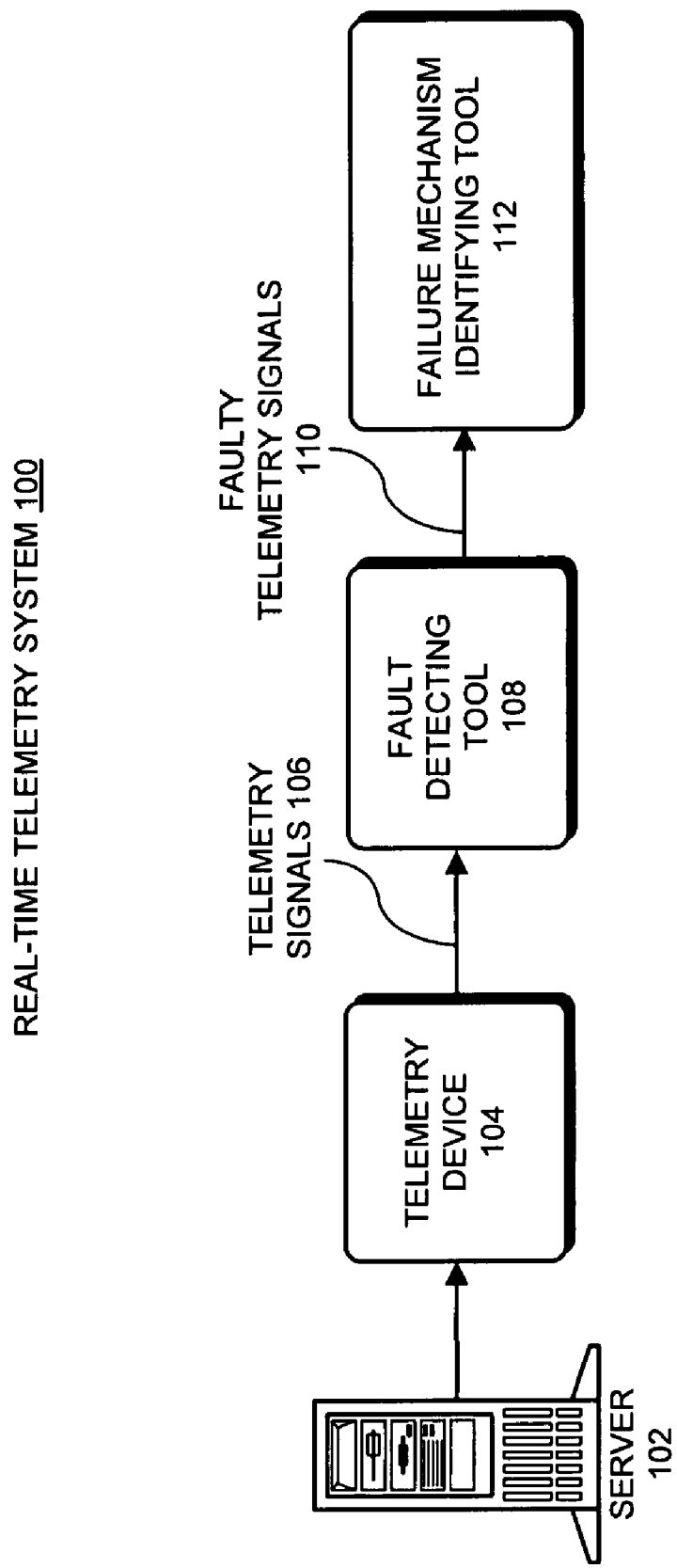
FIG. 1 illustrates a real-time telemetry system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media.

Overview

While high-resolution telemetry signals facilitate high-precision detection and prediction of anomalous activity, limitations on data transfer bandwidth and storage space typically make it hard to support real-time acquisition and recording of high-resolution time series. On the other hand, while low-resolution time series allow efficient real-time monitoring of the telemetry signals, they are less likely to detect the onset of subtle anomalies that precede component or system failures.

One embodiment of the present invention provides a technique that dynamically adjusts the data resolution of a signal based on the activity level indicated by the telemetry signal being monitored. Specifically, when the monitored activity level of the telemetry signal is normal, which indicates normal system operation, a low-resolution telemetry signal is collected and recorded. On the other hand, when the onset of signal degradation is detected or predicted, a high-resolution telemetry signal is collected and recorded. In particular, if anomalous behavior is detected in one or more signals within a plurality of signals being monitored, the signals resolutions are increased for all the monitored signals, including the ones showing no anomalies. This is desirable because meaningful correlation analyses (or other pattern matching techniques) can be performed across all the monitored signals recorded at the high resolutions.

As the signal degradation persists, the high-resolution telemetry signal is continuously monitored and analyzed. After the telemetry signal behavior returns to normal, the system resumes collecting and monitoring the low-resolution telemetry signal. By dynamically varying the data acquisition resolution, the present invention can achieve improved sensitivity and false-alarm avoidance, without requiring system resources to continuously process high-resolution data. Note that we use the terms "signal time resolution" and "signal sampling rate" interchangeably in the discussion below.

Real-Time Telemetry System

FIG. 1 illustrates real-time telemetry system 100 in accordance with an embodiment of the present invention. Real-time telemetry system 100 contains server 102. Server 102 can generally include any computational node including a mechanism for servicing requests from a client for computational and/or data storage resources. In the present embodiment, server 102 is a uniprocessor or multiprocessor server that is being monitored by real-time telemetry system 100.

Note that the present invention is not limited to the computer server system illustrated in FIG. 1. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

Alternatively, server 102 can be replaced by a reliability test system, such as a stress-test chamber. Such a reliability test system can contain a single or multiple units of components or devices under reliability studies, wherein these components or devices are subject to stress conditions. Moreover, server 102 can be replaced by any electronic components or devices that can be real-time monitored during their operation.

Real-time telemetry system 100 also contains telemetry device 104, which gathers telemetry signals 106 from the various sensors and monitoring tools within server 102, and directs telemetry signals 106 to a local or a remote location that contains fault-detecting tool 108. Telemetry signals 106 are also recorded in a storage device.

Note that the telemetry signals 106 which are gathered by real-time telemetry system 104 can include signals associated with physical and/or software performance parameters measured through sensors within the computer system. The physical parameters can include, but are not limited to: distributed temperatures within the computer system, relative humidity, cumulative or differential vibrations within the computer system, fan speed, acoustic signals, currents, voltages, time-domain reflectometry (TDR) readings, and miscellaneous environmental variables. The software parameters can include, but are not limited to: load metrics, CPU utilization, idle time, memory utilization, disk activity, transaction latencies, and other performance metrics reported by the operating system.

Also note that telemetry signals 106 can include outputs from primary system variables, i.e., parameters that reflect the primary function of a component or system, for example, the voltage of a power supply, or the laser output power from an optical transmitter. Telemetry signals 106 can also include outputs from inferential variables which are monitored when primary system variables are not possible or difficult to access. For example, if one monitors the electrical current being applied to laser devices, subtle anomalies detected in the time series of the current can be used to infer device degradation and/or failure.

Fault-detecting tool 108 monitors and analyzes telemetry signals 106 in real-time. Specifically, fault-detecting tool 108 detects anomalies in telemetry signals 106, and by analyzing anomalous behavior of telemetry signals 106, predicts probabilities of specific faults and failures in server 102. In one embodiment of the present invention, fault-detecting tool 108 is a Continuous System Telemetry Harness (CSTH), which performs a Sequential Probability Ratio Test (SPRT) on telemetry signals 106. Note that the SPRT provides a technique for monitoring noisy process variables and detecting the incipience or onset of anomalies in such processes with high sensitivity. In one embodiment of the present invention, telemetry device 104 and fault-detecting tool 108 are both embedded in server 102 which is being monitored.

When fault-detecting tool 108 detects anomalies in telemetry signals 106, fault-detecting tool 108 sends the faulty telemetry signals 110 to failure-mechanism-identifying tool 112. Failure-mechanism-identifying tool 112 then performs root-cause-analyses on the faulty telemetry signals 110 to identify possible failure mechanisms associated with each of the faulty telemetry signals.

Note that telemetry signals 106 are typically acquired at low resolution whether a degradation event is occurring or not. We now describe a number of techniques that facilitate dynamically adjusting telemetry signal resolutions based on an occurrence of an anomalous activity in the monitored signals.

Dynamically Adjusting Signal Sampling Rate While Using a Buffer

Figure 2:
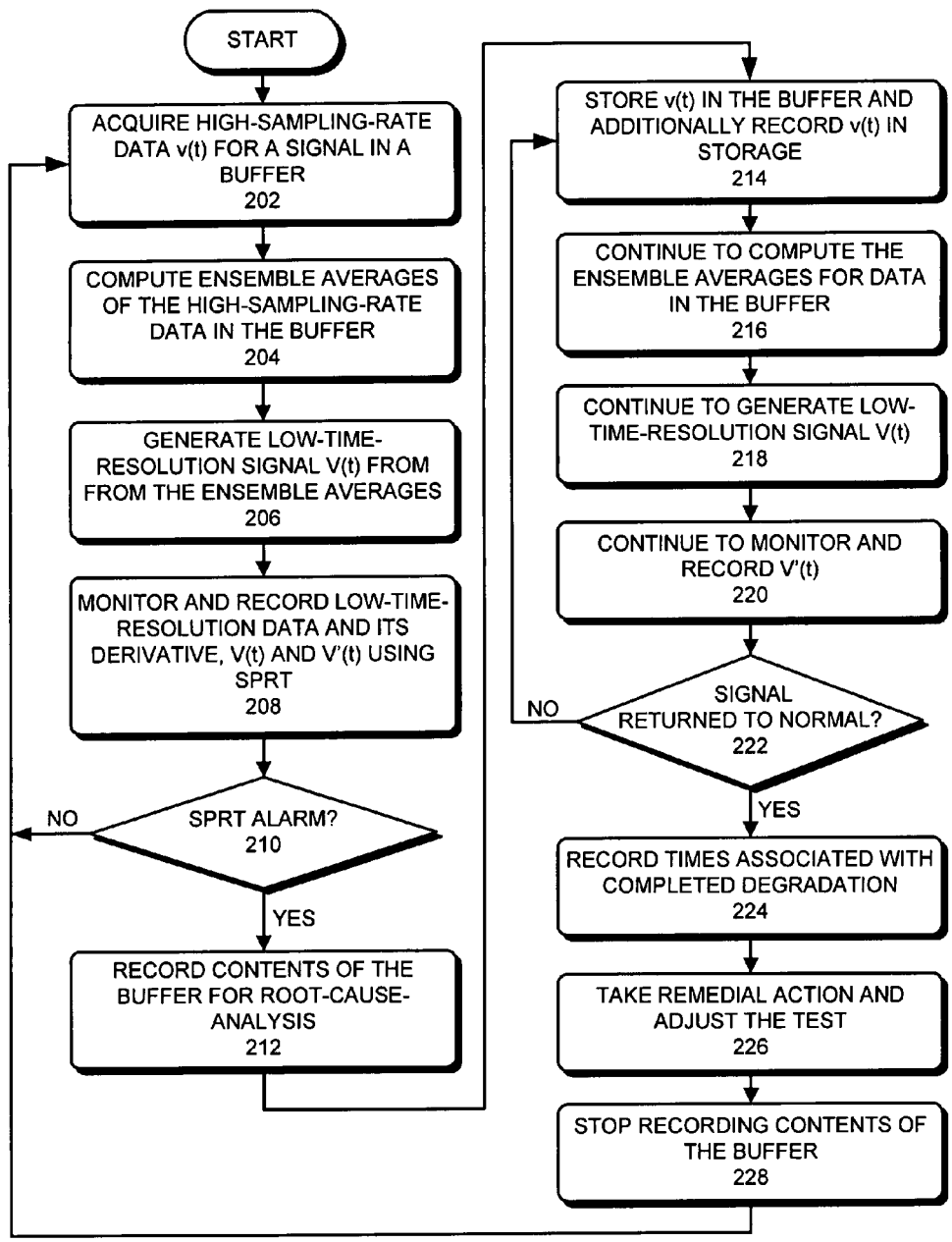
FIG. 2 presents a flowchart illustrating the process of dynamically adjusting sampling rate during proactive-fault-monitoring in accordance with an embodiment of the present invention.

FIG. 2 presents a flowchart illustrating the process of dynamically adjusting sampling rate during proactive-fault-monitoring in accordance with an embodiment of the present invention.

During a proactive-fault-monitoring operation, the system acquires a high-sampling-rate time series v(t) for a telemetry signal v, such as the CPU voltage (step 202). Specifically, the signal being monitored is sampled at a predetermined high-sampling-rate to generate a time series which contains detailed information of the signal.

This high-sampling-rate time series is temporarily stored in a buffer instead of being recorded in permanent storage. Note that the buffer has a limited size and can be implemented either in hardware or in software. Furthermore, the buffer can be implemented either internally or externally to the system under surveillance. For example, if data transfer bandwidth is limited, it is preferable to use an internal buffer of the system being monitored. Note that when the buffer becomes full, new high-sampling-rate data can overwrite old-data.

The system then computes an ensemble average of the high-sampling-rate data in the buffer (step 204). Specifically, the system computes a sequence of ensemble averages, wherein each ensemble average is the average of the high-sampling-rate data within a corresponding predetermined time interval. For example, the high-sampling-rate data can be collected at 1 second per sample, and subsequently stored in the buffer, while an ensemble average can be computed every 15 seconds. Note that this computation can be performed each time when the buffer becomes filled. Alternatively, the computation can be performed as a running average while the buffer is being filled.

The system next generates a low-time-resolution signal V(t) from the sequence of ensemble averages (step 206).

The system then monitors the low-time-resolution signal V(t) and its derivative V'(t) simultaneously using the Sequential Probability Ratio Test (SPRT) technique (step 208). Note that the SPRT technique can detect subtle changes in a time series with high sensitivity and robustness, even when the sampling rate is low and variations in the variables are a small percentage of the quantization resolution. For example, if the signal value v starts to drift upward from a normal constant value, both V(t) and V'(t) will start to change. Using SPRT to monitor both V(t) and V'(t) facilitates accurately determining the onset time of degradation, and gathering telemetry signals at greater resolution and accuracy during the degradation period. Alternatively, the SPRT can be used to monitor either V(t) or V'(t).

However, note that other sequential detection techniques other than the SPRT can be used to detect and predict an onset of signal degradation in the low-time-resolution signals.

During the monitoring process, the low-time-resolution signal V(t) is also being recorded. Note that the low-time-resolution signal can be efficiently stored without consuming a large amount of storage capacity.

As the SPRT is used to monitor the time series of the buffer averages, the system determines if an SPRT alarm has been generated (step 210).

If no SPRT alarm has been generated, the system returns to step 202 and repeats the procedure from step 202 to step 210.

If a SPRT alarm has been generated, the system records high-sampling-rate data associated with the faulty low-time-resolution signal from the buffer to permanent storage (step 212). In one embodiment of the present invention, the system records the entire buffer contents to permanent storage. This captured high-resolution data can be subsequently used to perform root-cause-analysis operation. This high-resolution signal can also be used to determine, whether and when to "take a remedial action," for example, triggering automated Domain Reconfiguration (DR).

Next, the system continues to acquire high-sampling-rate data v(t) and stores v(t) in the buffer. The system additionally records v(t) in the permanent storage for post-processing (step 214).

The system also continues to: compute the ensemble averages from the buffer (step 216) and generate low-time-resolution signal V(t) (step 218). The system also continues to monitor and record V'(t) using the SPRT technique (step 220). Specifically, while monitoring V'(t), the SPRT determines if the signal has returned to normal (step 222). This can be inferred from V'(t) when the value returns to zero.

In a further embodiment of the present invention, instead of monitoring and recording only V'(t), the system monitors and records both V(t) and V'(t).

When the SPRT determines that the signal degradation has completed, the system records the time information associated with the degradation (step 224). This can include: the onset time, the completion time, and the duration of the degradation. Note that at this point in the process, the system can also decide if any action should be taken and/or any adjustment should be made to the test conditions based on newly observed degradation information (step 226). For example, if the duration of the degradation is much shorter than normally expected, the ensemble average interval can be decreased to increase the resolution of V(t) and V'(t), and the buffer size can be adjusted as well.

Next, the system stops recording the contents of the buffer into permanent storage (step 228) and returns to step 202 to continue monitoring the normal signal v(t). Note that using the buffer to temporarily capture the high-resolution data and recording this data to a storage device only if the signal is degrading significantly reduces the burden of the storage device.

Dynamically Adjusting Sampling Rate Without Using a Buffer

Figure 3:
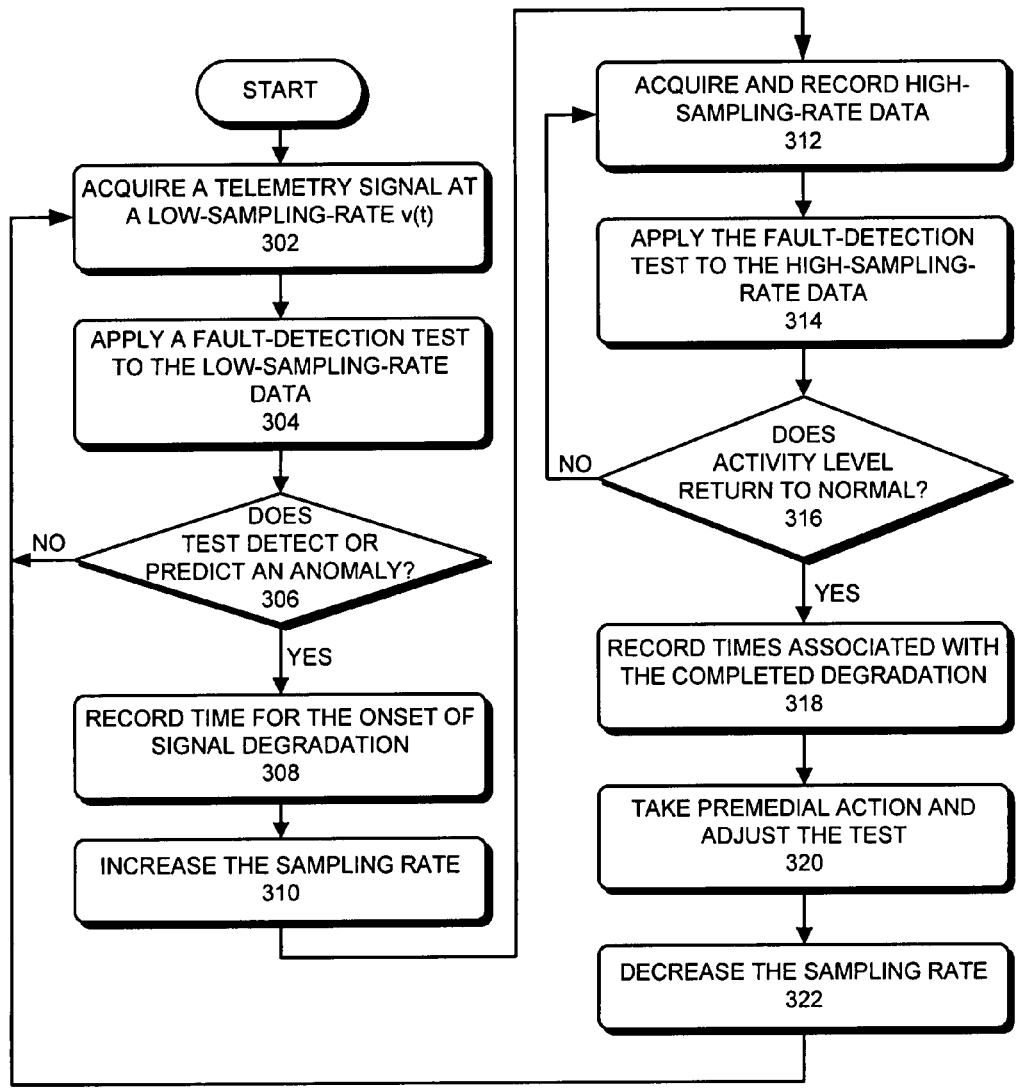
FIG. 3 presents a flowchart illustrating the process of dynamically adjusting data acquisition sampling rate during proactive-fault-monitoring in accordance with an embodiment of the present invention.

FIG. 3 presents a flowchart illustrating the process of dynamically adjusting a data acquisition sampling rate during proactive-fault-monitoring in accordance with an embodiment of the present invention.

During the proactive-fault-monitoring process, the system acquires and records a telemetry signal at a predetermined low-sampling-rate v(t), which is associated with a normal system operation (step 302). In one embodiment of the present invention, this predetermined low-sampling-rate is sufficiently high so that it can be used to detect significant variations in the signal values. On the other hand, the predetermined sampling rate is sufficiently low so that recording the data on a storage device does not consume excessive storage.

The low-sampling-rate time series is monitored using a fault-detection technique to detect and/or to predict an impending anomaly (step 304). In one embodiment, a linear-extrapolation technique, such as a linear predictive code (LPC), is applied to the low-sampling-rate time series to detect an increase in the signal activity. In a further embodiment, the SPRT technique is applied to the time series.

The system then determines if the fault-detection technique has found an anomaly in the monitored time series (step 306). If not, the system returns to step 302 and continues to monitor the low-sampling-rate data v(t).

If an anomaly is detected, the system records the time of the onset of the corresponding signal degradation (step 308). The system then increases the sampling rate (step 310), for example, by a factor two or three from the predetermined low-sampling-rate. Note that adjusting sampling rate of the telemetry signal can involve using either hardware or software mechanisms to adjust the sampling rate.

Next, the system starts to acquire and record the high-sampling-rate data (step 312), and continues to apply the fault-detection test to the high-sampling-rate date (step 314). In one embodiment of the present invention, during ongoing signal degradation, the system continuously adjusts the sampling rate based on the activity level of the signal. Specifically, if the monitored activity level in the signal is increasing or decreasing, the system can increase or decrease the sampling rate accordingly.

While monitoring the anomalous signal, the system continuously determines if the degradation has completed based on the results from step 314 (step 316). If not, the system returns to step 312. Otherwise, if step 314 indicates that the activity level has returned to normal, the system records time information associated with the completed degradation process, including: the onset time, the completion time, and duration of the degradation (step 318). Next, the system can decide if any action should be taken and/or any adjustment should be made to the test conditions based on newly observed degradation information (step 320), for example, the system can adjust parameters in the LPC.

Next, the system decreases the sampling rate back to the predetermined low-sampling-rate for normal operation (step 322) and returns to step 302 to continue proactive fault monitoring.

Dynamically Adjusting Quantization Resolution

In one embodiment of the present invention, instead of dynamically adjusting the sampling rate based on the signal behavior, the system adjusts the sample quantization resolution, i.e., the number of bits per sample, based on the monitored signal behavior. Note that the system can adjust the sample quantization resolution by directly controlling the A/D converter used for signal digitization. Or, alternatively, the system can use software to change the digitization resolution after the signal values have been digitized by the A/D converter.

When incorporated into a proactive-fault-detection process, this technique is similar to the technique previously described in conjunction with FIG. 3.

More specifically, instead of using a low-sampling-rate time series during normal operation, the system acquires, stores, and monitors time series at a predetermined small number of bits per sample, for example, using 8 bits. However, during the onset of degradation event (which can be triggered by the SPRT alarms), the system switches to monitoring and storing the same telemetry signal at a high numbers of bits per sample, for example using 16 bits. The system can also continuously adjust the quantization resolution based on the activity level of the anomalous signal. When the signal returns to normal, the system resumes monitoring and storing the telemetry signal at the predetermined low number of bits per sample, e.g., using the 8 bits.

Alternative Combinations

One embodiment of the present invention combines the time resolution adjustment with quantization resolution adjustment. Specifically, in step 302 of FIG. 3, the system acquires the telemetry signal both at the predetermined low-sampling-rate and a predetermined low quantization resolution. When fault is detected or predicted in step 306, the system increases the sampling rate and additionally increases quantization resolution for each sample at step 310. After the completion of the signal degradation, both the sampling rate and the quantization resolution are restored to their previous values to resume the normal system operation.

In a further embodiment of the present invention, the technique associated with FIG. 2 can also include a quantization resolution adjustment. Specifically in step 202, high-sampling-rate data can be acquired at a higher number of bits per sample, and while generating the low-time-resolution signal in step 206, each low-sampling-rate sample can be further downconverted to a lower number of bits. Also, after an anomaly is detected or predicted by the SPRT in step 210, the high-sampling-rate and higher number of bits per sample data can be stored in permanent storage for root-cause-analysis purpose.

CONCLUSION

The behavior of monitored system variables can provide valuable information on the current and future state of an associated component and/or system. Because the telemetry data can be analyzed in-situ and in real-time, risk assessments can be made in real-time and remedial actions can be taken rapidly to protect the system. By offering the ability to dynamically adjusting sampling rate and quantization resolution of the telemetry data in real-time, the present invention can substantially improve sensitivity and false-alarm avoidance during proactive-fault-monitoring, without causing an undesirable burden on system resources.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically adjusting data resolution during proactive-fault-monitoring in a computer system, comprising:

while performing the proactive-fault-monitoring, temporarily storing high-resolution data for a telemetry signal from the computer system in a buffer;

generating low-resolution data for the telemetry signal from the high resolution data, which involves downsampling the high resolution data;

monitoring the low-resolution data, and while doing so determining if an anomaly exists in the low-resolution data using a fault-detection technique; and if an anomaly exists in the low-resolution data, recording the high resolution data from the buffer on a storage device.

2. The method of claim 1, wherein generating the low-resolution data from the high-resolution data involves:

computing a sequence of ensemble averages from the high-resolution data, wherein each ensemble average is the average of the high-resolution data within a corresponding predetermined time interval; and forming the low-resolution data from the sequence of ensemble averages.

3. The method of claim 1, wherein determining if an anomaly exists in the low-resolution data involves:

applying a sequential probability ratio test (SPRT) to the low-resolution data and a time derivative of the low-resolution data; and determining that an anomaly exists if the SPRT generates an alarm.

4. The method of claim 1, wherein while an anomaly continues to exist, the method further comprises:

storing the high-resolution data in the buffer while recording the high-resolution data on the storage device;

generating the low-resolution data from the high-resolution data, which involves downsampling the high resolution data; and monitoring the low-resolution data.

5. The method of claim 1, wherein if the telemetry signal returns to normal, the method further comprises:

recording time information associated with the anomaly; and stopping recording of the high-resolution data on the storage device.

6. The method of claim 1, wherein the method further comprises performing a root-cause-analysis operation on the high-resolution data recorded on the storage device.

7. A method for dynamically adjusting data resolution during proactive-fault-monitoring of a computer system, comprising:

while performing the proactive-fault-monitoring, sampling a telemetry signal from the computer system at a predetermined sampling rate;

analyzing the sampled telemetry signal to detect and/or predict anomalous activity in the telemetry signal using a fault-detection technique; and if anomalous activity is detected and/or predicted,
sampling the telemetry signal at an increased sampling rate; and
analyzing the telemetry signal at the increased sampling rate using a fault-detection technique, wherein dynamically adjusting data resolution improves fault-detection sensitivity and false-alarm avoidance, without requiring system resources to continuously process high-resolution data.

8. The method of claim 7, wherein the method further comprises dynamically adjusting the sampling rate based on the detected and/or predicted anomalous activity of the telemetry signal.

9. The method of claim 7, wherein if the anomalous activity of the telemetry signal returns to normal, the method further comprises restoring the sampling rate to the predetermined sampling rate.

10. A method for dynamically adjusting data resolution during proactive-fault-monitoring of a computer system, comprising:

while performing the proactive-fault-monitoring, sampling a telemetry signal using a predetermined number of bits per sample;

analyzing the sampled telemetry signal to detect and/or predict anomalous activity in the telemetry signal using a fault-detection technique; and if anomalous activity is detected and/or predicted,
sampling the telemetry signal using an increased number of bits per sample; and
analyzing the telemetry signal at the increased number of bits per sample using a fault-detection technique, wherein dynamically adjusting data resolution improves fault-detection sensitivity and false-alarm avoidance, without requiring system resources to continuously process high-resolution data.

11. The method of claim 10, wherein while sampling the telemetry signal, the method further comprises dynamically adjusting the number of bits per sample based on the detected and/or predicted anomalous activity of the telemetry signal.

12. The method of claim 10, wherein if the anomalous activity of the telemetry signal returns to normal, the method further comprises resuming sampling of the telemetry signal using the predetermined number of bits per sample.

13. An apparatus that dynamically adjusts data resolution during proactive-fault-monitoring in a computer system, comprising:

a storing mechanism configured to store high-resolution data for a telemetry signal from the computer system in a buffer while performing the proactive-fault-monitoring;

a generating mechanism configured to generate low-resolution data for the telemetry signal from the high-resolution data, which involves downsampling the high resolution data;

a monitoring mechanism configured to monitor the low-resolution data, and while doing so determining if an anomaly exists in the low-resolution data using a fault-detection technique; and a recording mechanism configured to record the high-resolution data from the buffer into a storage device only if an anomaly exists on the low-resolution data.

14. The apparatus of claim 13, wherein the generating mechanism configured to:

compute a sequence of ensemble averages from the high-resolution data, wherein each ensemble average is the average of the high-resolution data within a corresponding predetermined time interval; and form the low-resolution data from the sequence of ensemble averages.

15. The apparatus of claim 13, wherein the monitoring mechanism is configured to determine if an anomaly exists in the low-resolution data by:

applying a sequential probability ratio test (SPRT) to the low-resolution data and a time derivative of the low-resolution data; and determining that an anomaly exists if the SPRT generates an alarm.

16. The apparatus of claim 13,
wherein the recording mechanism is configured to continue to store the high-resolution data in the buffer while recording the high-resolution data on the storage device if an anomaly continues to exist;

wherein the generating mechanism is configured to continue to generate the low-resolution data from the high-resolution data if an anomaly continues to exist; and wherein the monitoring mechanism is configured to continue to monitor the low-resolution data if an anomaly continues to exist.

17. The apparatus of claim 13, wherein the monitoring mechanism is further configured to:

determine if the telemetry signal returns to normal; and if so, to record time information associated with the anomaly; and stop recording of the high-resolution data on the storage device.

18. The apparatus of claim 13, further comprising an analysis mechanism configured to perform a root-cause-analysis on the high-resolution data recorded on the storage device.

19. An apparatus that dynamically adjusts data resolution during proactive-fault-monitoring of a computer system, comprising:

a sampling mechanism configured to sample a telemetry signal from the computer system at a predetermined sampling rate while performing the proactive-fault-monitoring;

an analysis mechanism configured to analyze the sampled telemetry signal to detect and/or predict anomalous activity in the telemetry signal using a fault-detection technique;

wherein the sampling mechanism is configured to sample the telemetry signal at an increased sampling rate if anomalous activity is detected and/or predicted by the analysis mechanism; and wherein the analysis mechanism is configured to analyze the telemetry signal at the increased sampling rate using a fault-detection technique, wherein dynamically adjusting data resolution improves fault-detection sensitivity and false-alarm avoidance, without requiring system resources to continuously process high-resolution data.

20. The apparatus of claim 19, further comprising an adjustment mechanism configured to dynamically adjust the sampling rate based on the detected and/or predicted anomalous activity of the telemetry signal.

21. The apparatus of claim 20, wherein the adjustment mechanism is configured to restore the sampling rate to the predetermined sampling rate when the anomalous activity of the telemetry signal returns to normal.

* * * * *